United States Patent [19]
Bartholomew

[11] Patent Number: 5,582,437
[45] Date of Patent: Dec. 10, 1996

[54] SWIVELABLE CONNECTOR FOR PLAIN END TUBES

[75] Inventor: Donald D. Bartholomew, Mt. Clemens, Mich.

[73] Assignee: Proprietary Technology, Inc., Bloomfield Hills, Mich.

[21] Appl. No.: 403,881

[22] PCT Filed: Sep. 21, 1992

[86] PCT No.: PCT/US92/07998

§ 371 Date: Mar. 17, 1995

§ 102(e) Date: Mar. 17, 1995

[87] PCT Pub. No.: WO94/07075

PCT Pub. Date: Mar. 31, 1994

[51] Int. Cl.$^6$ .................................................. F16L 33/22
[52] U.S. Cl. .................. 285/272; 285/242; 285/280; 285/255; 285/281
[58] Field of Search ..................... 285/272, 280, 285/98, 279, 249, 238, 281, 242, 255

[56] References Cited

U.S. PATENT DOCUMENTS

| | | |
|---|---|---|
| 1,657,987 | 1/1928 | Albertoni . |
| 1,802,572 | 4/1931 | Phillips . |
| 2,501,619 | 3/1950 | Schulthess . |
| 2,764,430 | 9/1956 | Roberts . |
| 2,825,588 | 3/1958 | Howard . |
| 3,262,718 | 7/1966 | Draudt . |
| 3,367,681 | 2/1968 | Braukman . |
| 3,957,293 | 5/1976 | Rodgers . |
| 4,225,162 | 9/1980 | Dola . |
| 4,412,693 | 11/1983 | Campanini ................... 285/272 |
| 4,486,034 | 12/1984 | Sauer . |
| 4,676,241 | 6/1987 | Webb et al. ................... 285/272 |
| 4,923,226 | 5/1990 | Bartholomew . |
| 4,969,668 | 11/1990 | Sauer . |
| 5,051,539 | 9/1991 | Leathers-Wiessner ............ 285/272 |
| 5,076,614 | 12/1991 | Yokomatsu et al. . |

FOREIGN PATENT DOCUMENTS 687700 8/1930 France .

Primary Examiner—Eric K. Nicholson
Attorney, Agent, or Firm—Harness, Dickey & Pierce, P.L.C.

[57] ABSTRACT

The present invention relates to a swivelable connector 10 for plain end flexible conduit 12 which includes a tubular conduit 22 having an annular projection 28 disposed a predetermined distance from a first end thereof, a sealing element 70 and a rotatable retainer 48 disposed within the axial bore of the plain end flexible conduit and a retainer element 34 positioned over the outer surface of the flexible conduit 12 which secures the flexible conduit between the rotatably retainer and the retainer elements and provides a relative rotation between the flexible conduit 12 and conduit 22.

19 Claims, 2 Drawing Sheets

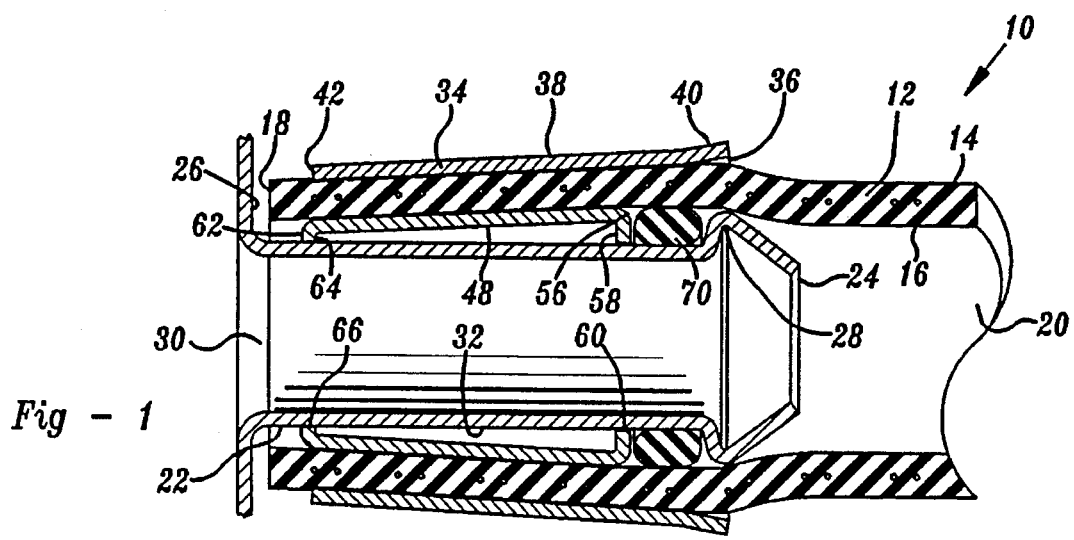
Fig - 1
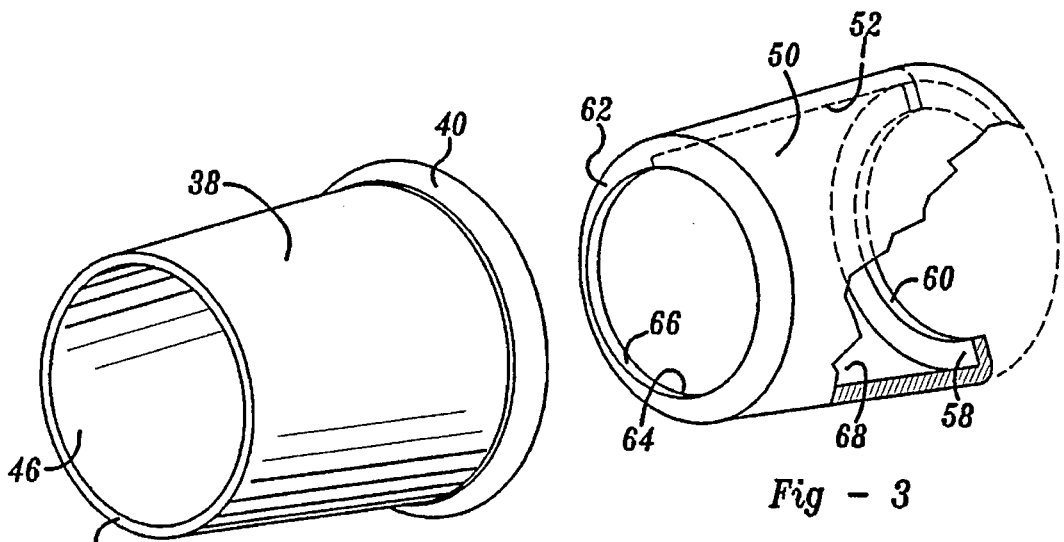
Fig - 2
Fig - 3
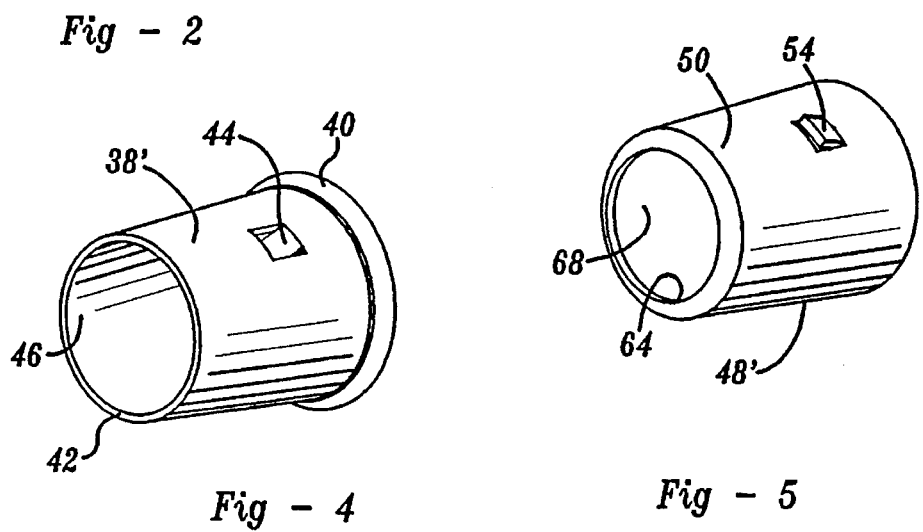
Fig - 4
Fig - 5

SWIVELABLE CONNECTOR FOR PLAIN END TUBES

BACKGROUND OF THE INVENTION

1. Field of the Invention

The present invention relates to connectors for plain end tubing, and more particularly, to a swivelable connector assembly for adjoining a plain end tube to another conduit.

2. Description of Related Art

In the automotive industry, as well as for many other industries, the need exist for low cost, reliable, and easy to assemble components. This need is especially apparent with respect to providing a connection between fluid carrying conduits such as fuel or refrigerant lines. In older connector assemblies, retention of a plain end hose to a fluid conveying conduit was accomplished by compressive means which did not allow for the rotation of the hose. For example, in the well known clamped and crimped ferrule connections which are often made to non-rotating nipples any twisting of the hose had to be accommodated by the hose in between the two end points of attachment. This problem resulted in the need for highly flexible tubing to handle the twisting force exerted upon the hose. It is desirable, however, to make connections using both highly flexible and moderately flexible hoses for different types of connections.

Accordingly, it is the primary object of the present invention to provide a swivelable connector assembly for providing a connection between a plain end hose and a tubular conduit.

In addition, it is an object of the present invention to provide a connector assembly which operates to both secure the plain end hose over the conduit and to position the sealing element within the hose.

Another object of the present invention is to provide a connector assembly wherein both highly flexible and moderately flexible hose can be utilized.

It is yet another object of the present invention to provide a swivelable hose connection wherein the hose is not permanently connected to the means of connection.

To achieve the foregoing objects, the present invention provides a swivelable connector assembly which generally comprises a plain end hose, an retainer, a rotating inner retainer, sealing means and a tubular conduit. The tubular conduit is adapted to convey fluid and is formed with an annular projection disposed a predetermined distance from the end of the conduit to be connected. The retainer is formed with an axial bore for receiving the plain end hose, inner and outer surfaces, and an outwardly projecting leading end to facilitate acceptance of the hose. The rotating inner retainer is provided with an axial bore for receiving the tubular conduit and an outer surface over which the hose is attached. Two incurved flanges are provided on the inner retainer which abut the outer surface of the conduit and allow for rotation of the connector assembly. The sealing means is disposed within the axial bore of the plain end hose and is located between the leading end of the rotating inner retainer and the annular projection of the tubular conduit.

Additional objects and advantages of the present invention will become apparent from reading the detailed description of the preferred embodiments which makes reference to the following set of drawings in which:

BRIEF DESCRIPTION OF THE DRAWINGS

FIG. 1 is a longitudinal cross-sectional view of a swivelable connector assembly according to the present invention in an installed position;

FIG. 2 is a perspective view of an outer retainer according to the present invention;

FIG. 3 is a perspective view, partially broken-away, of the rotating inner retainer according to the present invention;

FIG. 4 is a perspective view of a second embodiment of the outer retainer according to the present invention;

FIG. 5 is a perspective view of a second embodiment of the rotating inner retainer according to the present invention;

DETAILED DESCRIPTION OF THE PREFERRED EMBODIMENT

Figure 6:
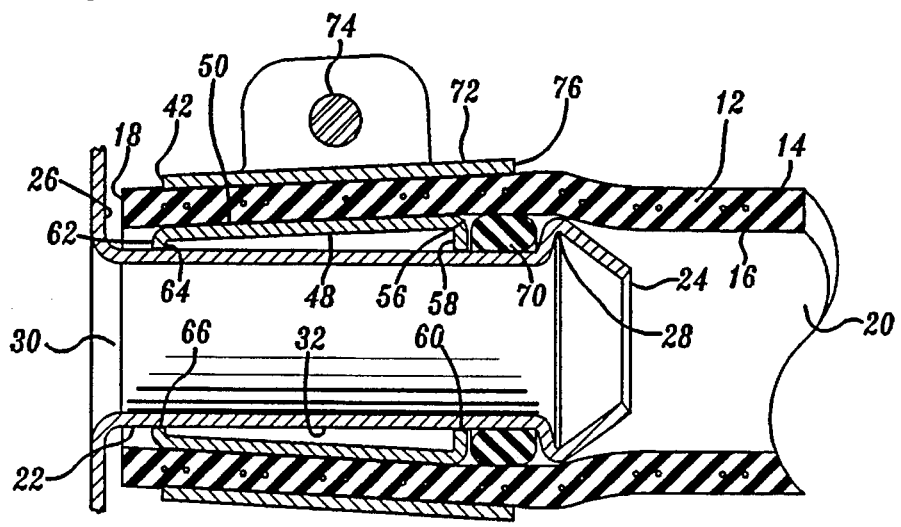
FIG. 6 is a longitudinal cross-sectional view, of another embodiment of the connector assembly according to the present invention.

Referring now to FIG. 1, a connector assembly 10, in accordance with one preferred embodiment, of the present invention is provided. The connector assembly 10 includes a plain end hose or flexible conduit 12, a tubular conduit 22, an retainer 34, a rotating inner retainer 48 and sealing means 70. The tubular conduit 22 is formed with an annular projection 28 disposed a pre-determined distance from a first end 24. Typically, the annular projection 28 occurs proximate to the leading end of the conduit, however, it is contemplated that other diameters of conduit 22 may be provided at various locations along the tubular conduit, and that the conduit 22 may have enlarged diameter portions (not shown) other than the projection 28 at various longitudinal positions thereon.

The retainer 34 is adapted to be disposed over the outer surface 14 of the plain end hose 12. The retainer 34 has an outwardly projecting leading end 40 to facilitate the insertion of the leading end 18 of the hose 12. The retainer 34 tapers slightly downwardly from the leading end 40 toward the trailing end 42 such that the diameter of the retainer 34 is greater at the leading end 40 than it is at the trailing end 42.

The rotating inner retainer 48 is adapted to be disposed generally within the axial bore 20 of the plain end hose 12. The rotating inner retainer includes at the leading end 56, a first incurred flange portion 58, and at the trailing end 62, a second incurved flange portion 64. This rotating inner retainer 48 also tapers downwardly from the leading end 56 toward the trailing end 62 such that the diameter of the inner retainer 48 is greater at the leading end 56 then it is at the trailing end 62.

Operation and assembly of the swivelable connector assembly 10 as disclosed in FIGS. 1, 2 and 3 will now be provided. Initially, the rotating inner retainer 48 and the elastomeric O-shaped sealing ring O-ring 70 are positioned over the tubular conduit 22 such that the sealing ring 70 is disposed between the leading end 56 of the inner retainer 48 from the annular projection 28 of the tubular conduit 22 and provides a fluid tight rotating seal between the I.D. of the hose 12 and the O.D. of the conduit 22. The edges 60 and 66 of the first and second incurved flange portions 58 and 64, respectively, rotatably engage the outer surface 32 of the tubular conduit 22. Similarly, the retainer 34 is positioned over the plain end hose 12. The leading end 18 of the hose 12 is inserted into the outwardly projecting leading end 40 of the retainer and the hose is advanced through the retainer's axial bore 46 such that the leading end 18 of the hose extends beyond the trailing end 42 of the retainer. With the retainer intact, the hose 12 is then positioned over the tubular conduit 22, rotating inner retainer 48 and sealing ring 70. The leading end 18 of the hose 12 is pushed over the annular projection 28 of the tubular conduit 22 and further advanced until the inner surface 16 of the hose 12 substantially overlaps the outer surface 50 of the inner retainer 48. This, in turn, causes sealing ring 70 to become entrapped between the annular projection 28 of the tubular conduit 22 and the leading end 56 of the inner retainer 48. Sealing ring 70 serves the additional function of retaining the inner retainer 48 upon the tubular conduit 22 prior to connecting the hose 12 and outer sleeve 34 over the inner sleeve 48, sealing ring 70 and tubular conduit 22.

Once the plain end hose 12 has been positioned over the rotating inner retainer 48 and sealing ring 70, the retainer 34 is moved back upon the outer surface 14 of the hose 12 in the direction of the leading end 18 to lock the hose in position over the tubular conduit 22, inner retainer 48 and sealing ring 70. The downward tapering of both the inner retainer 48 and the retainer 34 from the leading end to the trailing end causes the leading end 18 of the hose 12 to become pinched and secured in placed by the inner surface 36 of the retainer 34 and the outer surface 50 of the inner retainer 48. Note that the taper angles of the retainers 34 and 48 may be the same or slightly different and may be beneficially designed in the manner disclosed in the applicant's U.S. Pat. No. 4,923,226, which is assigned to the same assignee of this application. The connector assembly 10 can now be swivelably rotated without the hose becoming twisted as would be the case with non-rotating connector assemblies. Edges 60 and 66 of the first and second incurved flange portions 58 and 64, respectively, ride upon the outer surface 32 of the tubular conduit 22 as the inner retainer 48, plain end hose 12 and retainer 34 swivel and move in unison when the hose is rotated. Fluids can now be transferred from the axial bore 30 of the tubular conduit to the axial bore 20 of the hose 12. It is contemplated that the inner retainer 48 could be made of or coated with a material which provides a low amount of friction. Certain plastics such as polyethylene or other low friction materials such as teflon would be particularly useful.

Figure 7:
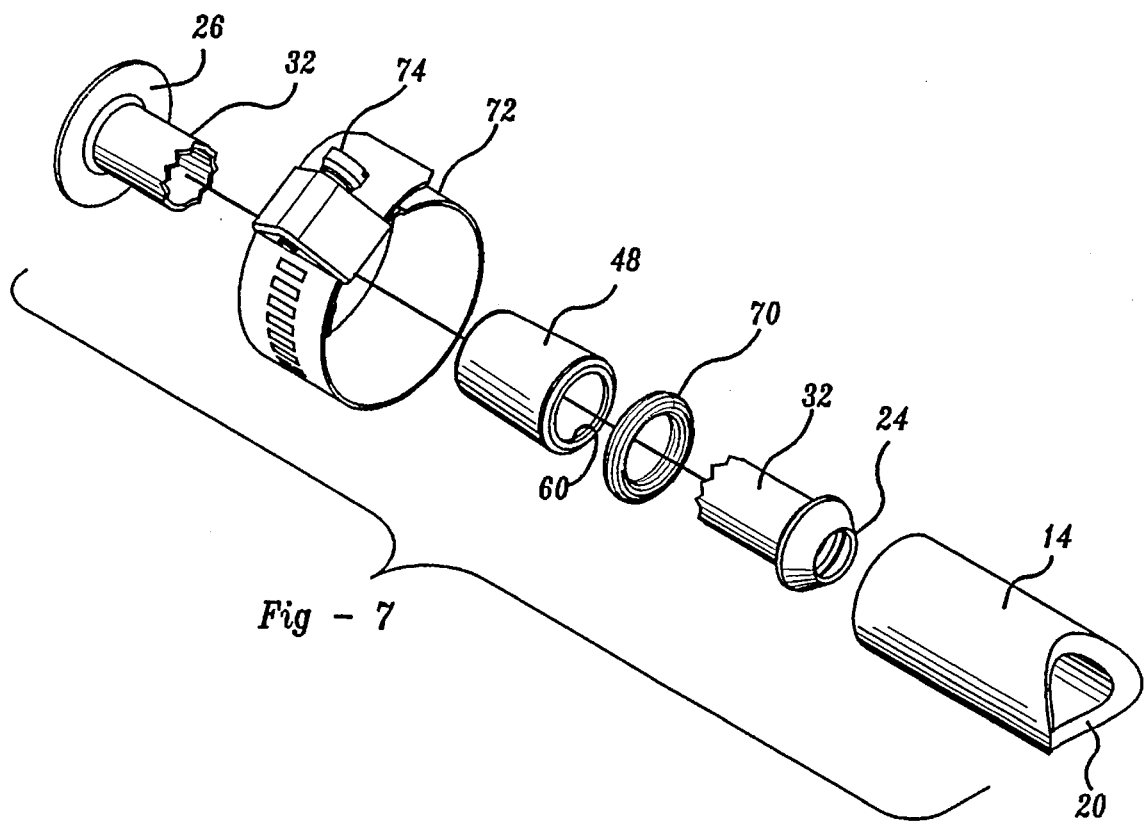
FIG. 7 is an exploded perspective view of the connector assembly illustrated in FIG. 6.

Referring to FIGS. 6 and 7, a second embodiment of a swivelable connector assembly of the present invention is disclosed. The connector assembly of FIG. 6 is essentially the same as that of FIG. 1 except that the retainer 34 of the embodiment shown in FIG. 1 is replaced by a screw-type hose clamp 72 in the embodiment of FIGS. 6 and 7. Therefore, identical reference numerals are used to describe identical features. Again, the inner rotating retainer 48 and the sealing ring 70 are positioned on the tubular conduit 22. The clamp 72 is then loosely positioned over the outer surface 14 of the plain end hose 12. The hose 12 is advanced over the tubular conduit 22, rotating inner retainer 48 and sealing ring 70 until the leading end 18 of the hose 12 extends past the trailing end 62 of the inner retainer 48. The clamp 72 is then aligned over the outer surface 14 of the hose at a point located between the annular projection 28 and the trailing end 26 of the tubular conduit 22. Clamp screw 74 is then rotated to reduce the diameter of the band 76 to the point that the inner surface 78 of the band compresses the hose against the outer surface 50 of the rotating inner retainer 48. Edges 60 and 66 of the first and second incurved flange portions 58 and 64, respectively, ride upon the outer surface 32 of the tubular conduit as the inner retainer 48, hose 12 and screw clamp 72 all rotate in unison when the hose 12 is rotated. As in the case with the embodiment of the present invention shown in FIG. 1, the angle of taper of the clamp 72 and inner retainer 48 may be the same or slightly different, pursuant to U.S. Pat. No. 4,923,226.

Referring to FIGS. 4 and 5, a slightly modified form of the invention shown in FIG. 1 is disclosed wherein the retainers 34' and 48' have been modified to include radially projecting tabs 44 and 54, respectfully, which assist in further locking the retainer to the hose. More specifically, the rotating inner retainer 48' includes at least one outwardly projecting tab member 54 which extends outwardly from outer surface 50 to further depress a portion of the inner surface 16 of hose 12. Likewise, the retainer 34' is provided with at least one tab member 44 which projects inwardly from the inner surface 36 to further depress a portion of the outer surface 14 of hose 12 upon assembly of the hose 12 between the retainers 34', 48'.

While the above description constitutes the preferred embodiments of the present invention, it is to be appreciated that the invention is susceptible to modification, variation and change without departing from the proper scope and the fair meaning of the accompanying claims.

I claim:

1. A swivelable connector assembly for use with a plane end flexible conduit, comprising:
    a tubular conduit having an axial bore and an external surface which includes an annular projection;
    first retainer means, said retainer means having first and second ends and an axial bore therethrough, said retainer means further including first and second apart and incurved annular flange portions for rotatably supporting said first retainer means on the external surface of said tubular conduit;
    a sealing element disposed on the external surface of the tubular conduit, said sealing element being disposed in axial registry with said annular projection; and
    second retainer means for securing said plane end flexible conduit over said first retainer means.

2. The swivelable connector assembly according to claim 1, wherein said second retainer means further comprise a tapered cylindrical sleeve having first and second ends and an axial bore therethrough, said first end of said sleeve including an outcurved portion to facilitate receipt of said plain end flexible conduit.

3. The swivelable connector assembly according to claim 2, wherein said tapered cylindrical sleeve is tapered slightly downwardly from the first end of said sleeve to the second end of said sleeve.

4. The swivelable connector assembly according to claim 1, wherein said first retainer means is tapered slightly downwardly from the first end to the second end.

5. The swivelable connector assembly according to claim 1, wherein said first annular flange is located proximate to the first end of said first retainer means and said second annular flange is located proximate to the second end of said first retainer means.

6. The swivelable connector assembly according to claim 1, wherein said first retainer means is provided with at least one outwardly projecting tab which supplements retention of the said flexible conduit.

7. The swivelable connector assembly according to claim 1, wherein said second retainer means is provided with at least one inwardly projecting tab which supplements retention of the said flexible conduit.

8. The swivelable connector assembly according to claim 1, wherein said sealing element comprises an O-ring.

9. The swivelable connector assembly of claim 1, wherein said second retainer means further comprises a circumferential band including means for increasing and decreasing the overall diameter of said band.

10. A swivelable connector assembly, comprising:
   a tubular conduit having an axial bore and annular projection;
   a tapered rotatable sleeve having an axial bore disposed between first and second ends and first and second spaced apart annular flanges projecting toward the outer diameter of said conduit;
   an O-ring sealing element;
   a plane end flexible conduit including an axial bore, said flexible conduit being disposed over the rotatable sleeve, tubular conduit and sealing element; and
   retainer means;
   whereby upon positioning said retainer means in alignment over the rotatable sleeve, sealing element and tubular conduit, said flexible conduit is rotatably retained in the assembly.

11. The swivelable connector assembly according to claim 10, wherein said retainer means further comprises a tapered cylindrical sleeve having first and second ends and an axial bore therethrough said first end including an outcurved portion to facilitate receipt of said plane end flexible conduit.

12. The swivelable connector assembly according to claim 11, wherein said retainer means is tapered slightly downwardly from a first end to a second end.

13. The swivelable connector assembly according to claim 12, wherein said rotatable sleeve means is tapered slightly downwardly from a first end to a second end at substantially the same taper angle as said retainer means.

14. The swivelable connector assembly according to claim 10, wherein said first annular flange is located proximate to the first end of said sleeve and said second annular flange is located proximate to the second end of said sleeve.

15. The swivelable connector assembly according to claim 10, wherein said rotatable sleeve is provided with at least one outwardly projecting tab which supplements retention of the said flexible conduit.

16. The swivelable connector assembly according to claim 10, wherein said retainer means is provided with at least one inwardly projecting tab which supplements retention of the said flexible conduit.

17. The swivelable connector assembly according to claim 12, wherein said rotatable sleeve means is tapered at a different taper angle than said retainer means.

18. The swivelable connector assembly of claim 10, wherein said retainer means further comprise a circumferential band including screw means for increasing and decreasing the overall diameter of said band.

19. The swivelable connector assembly according to claim 10, wherein at least one of said retainers includes means to secure said retainer to said flexible conduit.

* * * * *

UNITED STATES PATENT AND TRADEMARK OFFICE
CERTIFICATE OF CORRECTION

PATENT NO. : 5,582,437
DATED : December 10, 1996
INVENTOR(S) : Donald D. Bartholomew It is certified that error appears in the above-indentified patent and that said Letters Patent is hereby corrected as shown below:

Col. 1, Line 12, "exist" should be --exists--

Col. 1, Line 43, "an" should be --a--

Col. 2, Line 24, "an" should be --a--

Col. 2, Line 45, "incurred" should be --incurved--

Col. 2, Line 60, "incurred" should be --incurved--

Col. 3, Line 22, "placed" should be --place--

Col. 3, Line 40, "teflon" should be --Teflon®--

Col. 4, Line 6, "respectfully" should be --respectively--

Col. 4, Line 22, Claim 1, "plane" should be --plain--

Col. 4, Line 28, Claim 1, after "second" insert --spaced--

Col. 4, Line 36, Claim 1, "plane" should be --plain--

Col. 5, Line 11, Claim 10, "plane" should be --plain--

Col. 5, Line 24, Claim 11, "plane" should be --plain--

Signed and Sealed this

Twenty-third Day of September, 1997

Attest:

BRUCE LEHMAN

*Attesting Officer*     *Commissioner of Patents and Trademarks*